United States Patent
Ajima et al.

(10) Patent No.: US 12,170,497 B2
(45) Date of Patent: Dec. 17, 2024

(54) INVERTER CONTROL DEVICE AND ELECTRIC VEHICLE SYSTEM

(71) Applicant: Hitachi Astemo, Ltd., Hitachinaka (JP)

(72) Inventors: Toshiyuki Ajima, Tokyo (JP); Takafumi Hara, Tokyo (JP); Akihiro Ashida, Hitachinaka (JP); Hirokazu Matsui, Hitachinaka (JP); Kiyoshi Kuroda, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 128 days.

(21) Appl. No.: 17/917,395

(22) PCT Filed: Jan. 22, 2021

(86) PCT No.: PCT/JP2021/002144
§ 371 (c)(1),
(2) Date: Oct. 6, 2022

(87) PCT Pub. No.: WO2021/205709
PCT Pub. Date: Oct. 14, 2021

(65) Prior Publication Data
US 2023/0155534 A1  May 18, 2023

(30) Foreign Application Priority Data
Apr. 8, 2020  (JP) .................. 2020-069986

(51) Int. Cl.
*H02P 27/08* (2006.01)
*B60L 50/51* (2019.01)
(Continued)

(52) U.S. Cl.
CPC .............. *H02P 27/08* (2013.01); *B60L 50/51* (2019.02); *B60L 53/20* (2019.02); *H02M 7/5395* (2013.01); *B60L 2210/40* (2013.01)

(58) Field of Classification Search
CPC .......... H02P 27/08; B60L 53/20; B60L 50/51; B60L 2210/40; H02M 7/5395
(Continued)

(56) References Cited

U.S. PATENT DOCUMENTS

2010/0073977 A1* 3/2010 Nakamoto ............ H02M 7/217
363/126
2015/0357938 A1 12/2015 Yamasaki et al.
(Continued)

FOREIGN PATENT DOCUMENTS

JP  9-84360 A  3/1997
JP  2015-19458 A  1/2015
(Continued)

OTHER PUBLICATIONS

International Search Report and Written Opinion for PCT/JP2021/002144, dated Apr. 27, 2021.
(Continued)

*Primary Examiner* — Kawing Chan
(74) *Attorney, Agent, or Firm* — Volpe Koenig (57) ABSTRACT

An inverter control device 200 includes a PWM control unit 220 that generates a PWM pulse for controlling an inverter 100, and a pulse edge control unit 250 that performs pulse edge control for correcting (shifting) a phase of a pulse edge of the PWM pulse generated by the PWM control unit 220. The PWM control unit 220 generates a PWM pulse by using a modulation rate based on a voltage command (Vd*, Vq*). The pulse edge control unit 250 corrects the PWM pulse so that a phase difference between a zero cross point where the modulation wave changes across 0 and a pulse edge of the PWM pulse falls within a predetermined range.

8 Claims, 7 Drawing Sheets

(51) Int. Cl.
  *B60L 53/20*    (2019.01)
  *H02M 7/5395*   (2006.01)
(58) Field of Classification Search
  USPC .......................................................... 318/811
  See application file for complete search history.

(56)  References Cited

U.S. PATENT DOCUMENTS

2016/0211790 A1*   7/2016   Ajima .................... H02P 27/08
2019/0363646 A1*   11/2019  Ajima .................... H02P 27/08

FOREIGN PATENT DOCUMENTS

JP    5974646 B2      8/2016
JP    2018-133935 A   8/2018

OTHER PUBLICATIONS

Extended European Search Report issued on Apr. 8, 2024 for European Patent Application No. 21785088.2.

* cited by examiner

INVERTER CONTROL DEVICE AND ELECTRIC VEHICLE SYSTEM

TECHNICAL FIELD

The present invention relates to an inverter control device and an electric vehicle system using the same.

BACKGROUND ART

An inverter control device that controls driving of an inverter by pulse width modulation (PWM) control to rotationally drive a motor has been widely used. In such an inverter control device, there is known a technique of operating in an overmodulation mode (overmodulation region) in which an output voltage command of an inverter exceeds a maximum output level (sine wave) of the inverter in order to increase the rotation speed of the motor, and operating in one pulse mode (one-pulse region) in which a PWM pulse train is connected to form one pulse in order to further increase the output voltage.

When the inverter control device is operated from the overmodulation region to the one-pulse region, a voltage error occurs in the output of the inverter, and a direct-current component and a ripple component included in the output current of the inverter increase, so that output torque fluctuation and noise/vibration of the motor occur. Therefore, there is a demand for a technique for suppressing a voltage error in a region shifting from an overmodulation region to a one-pulse region and reducing a direct-current component and a ripple component of current.

The technique of PTL 1 is known regarding reduction of current ripple in an overmodulation region. PTL 1 describes an inverter device that generates a PWM pulse such that when trapezoidal wave modulation using a trapezoidal wave is performed in an overmodulation region, integrated values of areas of on-pulses and off-pulses of a plurality of PWM pulses in an inversion region of a modulation wave that changes from a bottom side to an upper side of the trapezoidal wave become equal.

CITATION LIST

Patent Literature

PTL 1: JP 2015-19458 A

SUMMARY OF INVENTION

Technical Problem

In the technique of PTL 1, it is not possible to appropriately control the timing of zero cross and the timing of the edge of the PWM pulse in a near-zero cross region including the zero cross point where the modulation wave changes across 0. Therefore, there is a possibility that an error occurs in the output voltage of the inverter, and a direct-current component or a current ripple increases in the output current of the inverter.

Solution to Problem

An inverter control device according to the present invention includes: a PWM control unit that generates a PWM pulse for controlling an inverter by using a modulation wave based on a voltage command; and a pulse edge control unit that corrects the PWM pulse such that a phase difference between a zero cross point where the modulation wave changes across 0 and a pulse edge of the PWM pulse falls within a predetermined range.

An electric vehicle system according to the present invention includes: an inverter control device; the inverter controlled by the inverter control device; and a three-phase synchronous motor driven by the inverter, in which the electric vehicle system travels using a rotational driving force of the three-phase synchronous motor.

Advantageous Effects of Invention

According to the present invention, it is possible to reduce a direct-current component and a current ripple of an inverter output current generated in a near-zero cross region.

DESCRIPTION OF EMBODIMENTS

The present invention provides an inverter control device that controls an inverter by PWM control, and when trapezoidal wave modulation using, as a modulation wave, a trapezoidal wave obtained by changing, for example, a sine wave into a trapezoidal shape is performed in an overmodulation region having a modulation rate of equal to or greater than a predetermined value, outputs a pulse edge of a PWM pulse such that a phase difference from a zero cross point of the modulation wave falls within a predetermined range, thereby increasing output of the inverter while reducing a direct-current component and a ripple component of output current of the inverter. An embodiment of the present invention will be described below with reference to the drawings.

Figure 1:
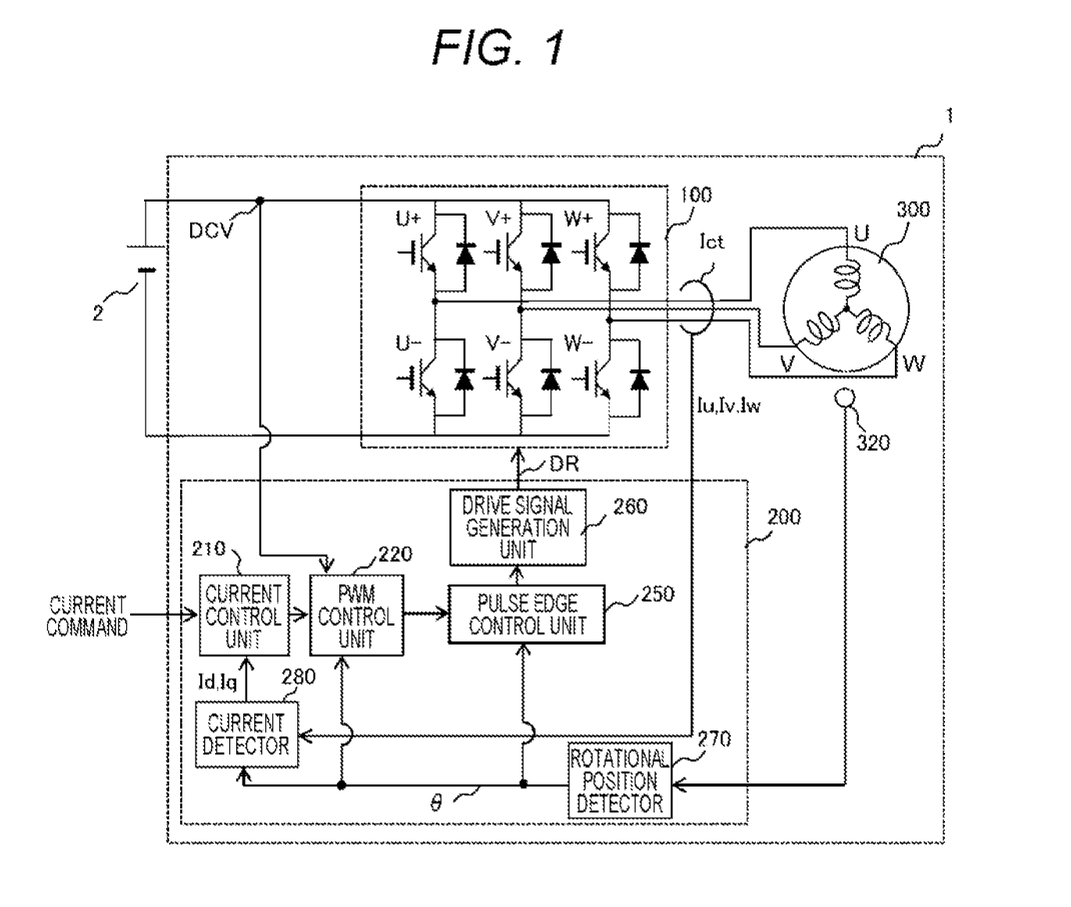
FIG. 1 is a block diagram illustrating a configuration of a motor device including an inverter control device according to an embodiment of the present invention.

FIG. 1 is a block diagram illustrating the configuration of a motor device 1 including an inverter control device 200 according to an embodiment of the present invention. The motor device 1 is connected to a battery 2, and includes an inverter 100, the inverter control device 200, and a motor 300.

The battery 2 is a direct-current voltage source of the inverter 100. Direct-current voltage DCV of the battery 2 is converted into a three-phase alternating-current voltage having a variable voltage and a variable frequency by the inverter 100, and is applied to the motor 300.

The motor 300 is a synchronous motor rotationally driven by supply of a three-phase alternating-current voltage. A rotational position sensor 320 is attached to the motor 300 in order to control the phase of the three-phase alternating-current voltage applied from the inverter 100 to the motor 300 in accordance with the phase of the induced voltage of the motor 300. Here, for example, a resolver including an iron core and a winding can be used as the rotational position sensor 320. Alternatively, the rotational position sensor 320 may be configured using a GMR sensor or a Hall element.

The inverter control device 200 includes a current control unit 210, a PWM control unit 220, a pulse edge control unit 250, a drive signal generation unit 260, a rotational position detector 270, and a current detector 280.

The rotational position detector 270 detects a rotational position θ of a rotor in the motor 300 based on the output signal of the rotational position sensor 320.

The current detector 280 acquires, from a current sensor Ict, three-phase current detection values (Iu, Iv, Iw) flowing through the motor 300, and performs three-phase/two-phase conversion on these current detection values based on the rotational position θ detected by the rotational position detector 270, thereby obtaining current detection values (Id, Iq) of a dq-axis.

The inverter control device 200 has a current control function for controlling the output of the motor 300. The current control unit 210 outputs a voltage command (Vd*, Vq*) such that a current detection value (Id, Iq) detected by the current detector 280 matches a current command value (Id*, Iq*) input from a high-order controller not illustrated.

The PWM control unit 220 performs three-phase pulse-width modulation (PWM) using the voltage command (Vd*, Vq*) obtained by the current control unit 210, the direct-current voltage DCV of the battery 2, and the rotational position θ, and generates a PWM pulse for controlling the inverter 100. Specifically, the PWM control unit 220 generates a three-phase voltage command (Vu*, Vv*, Vw*) by performing two-phase/three-phase conversion on the voltage command (Vd*, Vq*) based on the rotational position θ. Then, a modulation rate is calculated based on the voltage command (Vd*, Vq*) or the three-phase voltage command (Vu*, Vv*, Vw*) and the direct-current voltage DCV of the battery 2, and a modulation wave corresponding to the modulation rate is generated using this modulation rate and a carrier signal of a predetermined frequency. At this time, the PWM control unit 220 performs normal PWM modulation for comparing the carrier signal and the modulation wave to generate a PWM pulse in a region where the modulation rate is less than a predetermined value, for example, less than 1.15, and performs trapezoidal wave modulation using a trapezoidal wave as the modulation wave in a region where the modulation rate is equal to or greater than the predetermined value, for example, equal to or greater than 1.15. Details of the trapezoidal wave modulation will be described later.

The pulse edge control unit 250 performs pulse edge control for correcting (shifting) the phase of the pulse edge of the PWM pulse generated by the PWM control unit 220. By this pulse edge control, the PWM pulse is adjusted such that the phase difference between the zero cross point of the modulation wave and the pulse edge of the PWM pulse falls within a predetermined range. The zero cross point of the modulation wave is a point at which the modulation wave changes across 0. Details of an adjustment method of the PWM pulse by the pulse edge control unit 250 will be described later.

The drive signal generation unit 260 converts the PWM pulse in which the phase of the pulse edge is corrected by the pulse edge control performed by the pulse edge control unit 250 into a drive signal DR and outputs the drive signal DR to the inverter 100. The inverter 100 includes a plurality of semiconductor switch elements corresponding to each phase of the three-phase alternating-current voltage, and each semiconductor switch element is controlled to be turned on/off by the drive signal DR. Due to this, the output voltage of the inverter 100 is adjusted according to the control of the inverter control device 200.

In the above, the configuration example of the motor device 1 in a case where the current of the motor 300 is controlled according to the current command from the high-order controller has been described with reference to FIG. 1, but the configuration of FIG. 1 can be applied even in a case where another control method is adopted. For example, in a case of controlling the rotational speed of the motor 300, motor rotational speed ωr is calculated by the time change of the rotational position θ, and a voltage command or a current command is created so as to match the speed command from the high-order controller. In a case of controlling the output torque of the motor 300, a current command (Id*, Iq*) is created using a relational expression of the motor current (Id, Iq) and the motor torque or a map.

Next, a waveform chart illustrating a modulation wave in an embodiment of the present invention will be described with reference to FIG. 2. In the following, the PWM modulation operation for comparing a modulation signal waveform with a carrier signal of a triangular wave to generate a PWM pulse is described. However, in trapezoidal wave modulation using, as the modulation wave, a trapezoidal wave in which at least a sine wave is changed into a trapezoidal shape, it is preferable to generate the PWM pulse described later by direct calculation.

Figure 2:
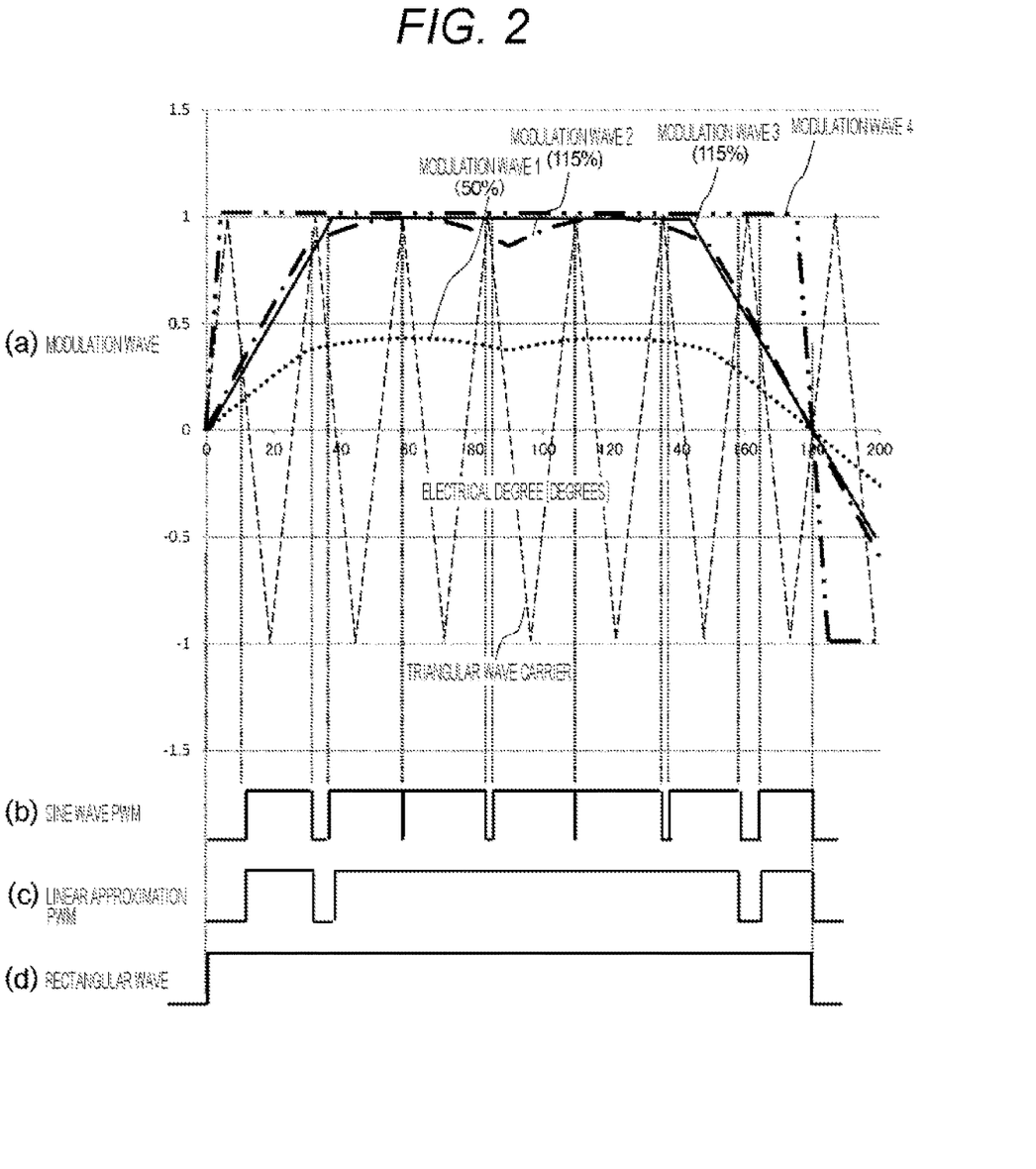
FIG. 2 is a waveform chart illustrating a modulation wave in an embodiment.

FIG. 2(a) illustrates an example of a modulation signal waveform and a carrier signal waveform. Regarding the modulation signal waveform, waveforms of a modulation signal (modulation wave 1) having a relatively low modulation rate, a maximum modulation wave (modulation wave 2) capable of sine wave modulation, a trapezoidal modulation wave (modulation wave 3) obtained by linearly approximating sine wave modulation, and a modulation wave (modulation wave 4) in a rectangular wave state where inverter output becomes maximum are illustrated. Regarding the carrier signal waveform, a waveform of a carrier signal of a triangular wave that is compared in magnitude with the modulation wave signal to generate a PWM pulse is illustrated.

FIG. 2(b) illustrates a PWM pulse signal in the case of the modulation wave 2, and FIG. 2(c) illustrates a PWM pulse signal in the case of the modulation wave 3. In FIG. 2(c), almost 100% of PWM pulses are continuously turned on in a section of the electrical degree of 30 to 150 degrees. FIG. 2(d) illustrates a PWM pulse signal of the modulation wave 4. This PWM pulse signal is on in the entire section of the electrical degree of 0 to 180 degrees.

Each modulation wave is equivalent to a modulation wave H(θ) for one phase of the three-phase voltage command (Vuc, Vvc, Vwc), and is substantially equal to a U-phase modulation wave Hu(θ)=Vuc/(DCV/2) if the dead time is ignored. Assuming that the effective value of the sine wave when the modulation rate=1 at which the inverter output is not saturated is 1, the fundamental wave component included in the modulation wave H(θ) on which a third harmonic is superimposed is 1.15 times (115%) (modulation wave 2). That is, the inverter output is not saturated until the voltage command at which the modulation rate becomes 1.15.

As illustrated in FIG. 2, the modulation wave H(θ) on which the third harmonic is superimposed can be linearly approximated near the zero cross. As the modulation rate increases, the modulation wave H(θ) approaches a trapezoidal wave like the modulation wave 3 from a shape like the modulation wave 2. Therefore, in a region where the modulation rate is equal to or greater than the predetermined value, for example, equal to or greater than 1.15, it is possible to generate a PWM pulse by calculation by using a trapezoidal wave such as the modulation wave 3. Due to this, the PWM modulation processing using a microcomputer or the like can be simplified, and at the same time, it is possible to control the voltage error of the PWM pulse due to the asynchronization between the modulation wave H(θ) and the carrier signal. In this case, the calculation period of the PWM pulse corresponds to the period of the carrier signal.

Considering the time of the modulation wave 2, an angular section of ±30 degrees in terms of electrical degree can be linearly approximated around the zero cross of the modulation wave, but it is preferable to set the angular section to ±35 degrees in terms of electrical degree in consideration of a voltage error near saturation.

In the PWM pulse calculation using the trapezoidal wave modulation, a slope A of the modulation wave in the section where linear approximation can be performed near the zero cross is proportional to the modulation rate according to the voltage command value, and the modulation wave is proportional to the angular position θ.

For example, when the angle near the zero cross is θ' and θ' is −30≤θ'≤30, the modulation wave H(θ') near the zero cross can be expressed by Equation (1).

$$H(\theta')=A\cdot\theta' \qquad (1)$$

That is, since the modulation wave H(θ) near the zero cross can be expressed by using the slope A of the modulation wave instead of the modulation rate, the inverter output pulse near the zero cross, that is, the PWM pulse can be determined from the slope A of the modulation wave.

Under the condition of |H(θ)|<|A·θ|, the inverter output pulse is only required to be determined as 100% if 0<θ<180, and as 0% if 180<θ<360.

Next, an example of pulse edge control in an embodiment of the present invention will be described with reference to FIG. 3.

Figure 3:
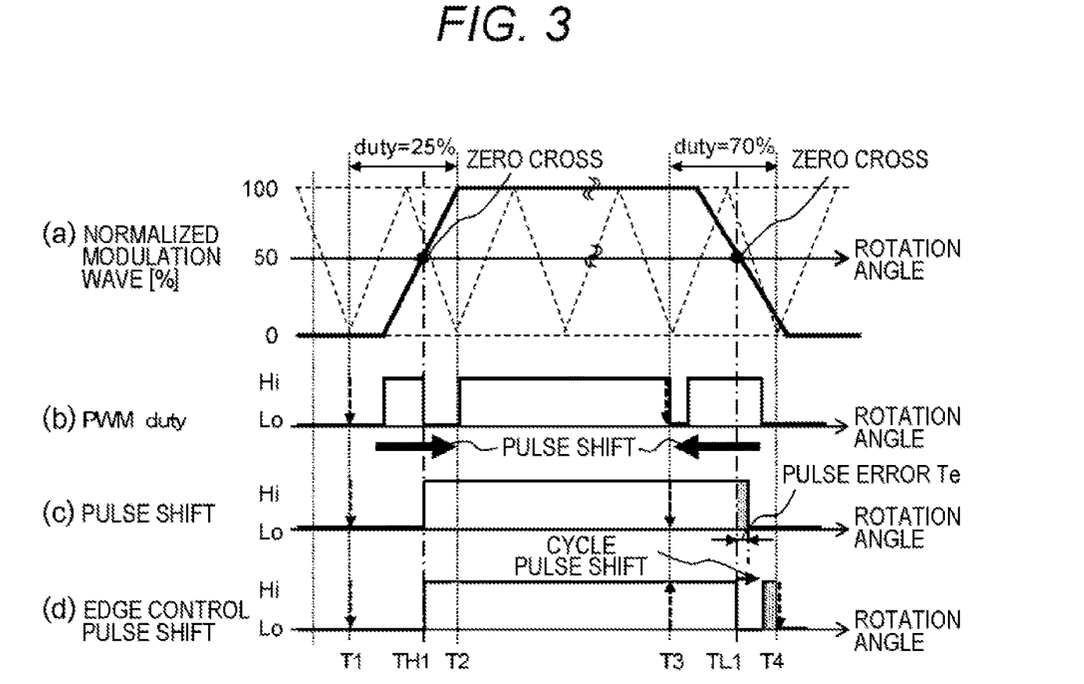
FIG. 3 is an explanatory view of an example of pulse edge control in an embodiment.

FIG. 3(*a*) illustrates a modulation waveform obtained by normalizing a part of a modulation wave including a zero cross point.

The normalized modulation wave illustrated in FIG. 3(*a*) is obtained by normalizing the above-described trapezoidal wave (modulation wave 3 in FIG. 2(*a*)), and its magnitude changes within a range of 0% to 100%. The point at which the magnitude of the normalized modulation wave is 50% represents the zero cross point of the modulation wave.

FIG. 3(*b*) illustrates a PWM pulse generated by the PWM control unit 220 of FIG. 1. The PWM control unit 220 can generate the PWM pulse illustrated in FIG. 3(*b*) by determining the duty of the PWM pulse based on the area of the normalized modulation wave in each period of the carrier signal illustrated in FIG. 3(*a*) and calculating the PMW pulse according to the duty by calculation. In FIG. 3(*a*), the carrier signal of the triangular wave is indicated by a broken line, but in a case where the PWM pulse is directly obtained by calculation without using a carrier signal as described above, the calculation period corresponds to the period of the carrier signal. Hereinafter, the calculation period of the PWM pulse and the period of the carrier signal are collectively referred to as "PWM period".

For example, time TH1 is timing of a zero cross point where the modulation wave is inverted from negative to positive. In the PWM period including this zero cross point, that is, in the section from time T1 to time T2, the area of the normalized modulation wave is 25%, and a PWM pulse having a duty of 25% is generated accordingly.

The section from the time T2 to time T3 is a section corresponding to the upper base of the trapezoidal wave, and in this section, the magnitude of the normalized modulation wave does not change from 100%. This indicates that the modulation wave is positively saturated. In this section, the duty of the PWM pulse becomes 100%.

Time TL1 is timing of a zero cross point where the modulation wave is inverted from positive to negative. In the PWM period including this zero cross point, that is, in the section from the time T3 to time T4, the area of the normalized modulation wave is 70%, and a PWM pulse having a duty of 70% is generated accordingly.

FIG. 3(*c*) illustrates a pulse shift in which the phase of the pulse edge is shifted in accordance with the zero cross point in the pulse edge control performed by the pulse edge control unit 250 of FIG. 1. As illustrated in FIG. 3(*c*), the pulse edge control unit 250 shifts, in accordance with the phase of the zero cross point, the pulse edge of each PWM pulse corresponding to the PWM period including the zero cross point among the PWM pulses generated corresponding to each PWM period. At this time, at the zero cross point where the modulation wave is inverted from negative to positive, the PWM pulse is shifted so that the rising edge of the PWM pulse matches the phase of the zero cross point, and at the zero cross point where the modulation wave is inverted from positive to negative, the PWM pulse is shifted so that the falling edge of the PWM pulse matches the phase of the zero cross point. Due to this, the PWM pulse is corrected such that the phase difference between the zero cross point of the modulation wave and the pulse edge of the PWM pulse falls within a predetermined range.

The predetermined range described above is set according to a phase range corresponding to a dead time of the inverter 100, for example. The actual output voltage of the inverter 100 during the dead time changes according to the conduction state of the freewheeling diode of the inverter 100. Therefore, in order to reduce the calculation load of the inverter control device 200 implemented by a microcomputer or the like, it is preferable to simplify the control logic of the pulse edge control unit 250 by setting the range of the phase corresponding to the dead time as the phase error range of the shifted pulse edge with respect to the zero cross point.

In general, the PWM pulse is generated using a compare match timer of a microcomputer. In the PWM pulse calculation using trapezoidal wave modulation, a timer value corresponding to the duty of the PWM pulse to be generated is set in the compare match timer, and a reset signal is output from the compare match timer at the timing of this timer value. At this time, by inverting the level of the reset signal at the rising and the falling of the PWM pulse, the PWM pulse can be generated with an arbitrary phase and duty. In such PWM pulse calculation, by changing the set timer value in accordance with the zero cross point, it is possible to achieve the pulse shift performed by the pulse edge control unit 250.

Here, in the section from the time T1 to the time T2, as illustrated in FIG. 3(*c*), the pulse edge of the PWM pulse can be shifted in accordance with the timing TH1 of the zero cross point. At this time, the number of pulses of the PWM pulse included in one period of the modulation wave decreases by integrating the PWM pulse after the pulse shift and the PWM pulse of the next PWM period.

On the other hand, in the section from the time T3 to the time T4, even if the pulse edge of the PWM pulse having the duty of 70% is matched the timing TL1 of the zero cross point, the phase difference between the zero cross point and the pulse edge does not fall within the predetermined range, and a portion (pulse error Te in FIG. 3(c)) protruding from there occurs. Therefore, a positive voltage error corresponding to the pulse error Te is superimposed on the PWM signal. That is, an ideal PWM pulse in the positive direction corresponding to one period of the trapezoidal modulation wave as in FIG. 3(a) is a pulse (Hi signal) from the timing TH1 of the zero cross point where the modulation wave is inverted from negative to positive to the timing TL1 of the zero cross point where the modulation wave is inverted from positive to negative next. However, the positive direction in FIG. 3(c) has a pulse width wider by the pulse error Te than that of the ideal PWM pulse. Therefore, as the output voltage of the inverter 100, a voltage more excessive than the original is applied to the motor 300. On the other hand, an ideal PWM pulse in the negative direction corresponding to one period of the trapezoidal modulation wave as in FIG. 3(a) is a pulse (Lo signal) from the timing TL1 of the zero cross point where the modulation wave is inverted from positive to negative to the timing (not illustrated) of the zero cross point where the modulation wave is inverted from negative to positive next.

However, the pulse in the negative direction in FIG. 3(c) has a pulse width narrower by the pulse error Te than that of the ideal PWM pulse. Therefore, the output voltage of the inverter 100 is insufficient in the negative direction than the original. For these reasons, the PWM pulse after the pulse shift illustrated in FIG. 3(c) causes a voltage offset in the positive direction as a whole in the output voltage of the inverter 100.

As described above, the pulse error Te in the PWM pulse after the pulse shift causes the voltage offset in which the output voltage of the inverter 100 is offset in the positive direction as a whole. This voltage offset causes an error that a direct-current component is superimposed on the output current of the inverter 100. In particular, in the overmodulation state, since the number of pulses is reduced, the influence of the voltage offset is liable to increase, and the direct-current component included in the output current of the inverter 100 causes a large torque ripple of the motor 300. Therefore, elimination of the pulse error Te due to the PWM pulse shift is an important problem for reducing the direct-current component and the current ripple of the inverter output current generated in the near-zero cross region.

FIG. 3(d) illustrates an example of a cycle pulse shift in which a portion of the pulse error Te in the pulse edge control performed by the pulse edge control unit 250 of FIG. 1 is separated and arranged. In order to match the pulse edge of the PWM pulse to the phase of the zero cross point while keeping the duty of the PWM pulse at 70% in the section from the time T3 to the time T4, the pulse edge control unit 250 separates the portion of the pulse error Te from the PWM pulse after the pulse shift and arranges it at another phase in the section from the time T3 to the time T4. Specifically, as illustrated in FIG. 3(d), a PWM pulse (Hi signal) having a pulse width corresponding to the pulse error Te protruding from the zero cross point is generated, and the shift amount is set such that the phase of its falling edge is matched the time T4.

Due to this, these PWM pulses can be cycled and arranged within one PWM period such that the duty of the sum of the PWM pulse from the time T3 to the timing TL1 of the zero cross point and the PWM pulse to the time T4 becomes 70%.

Since the pulse error Te is eliminated by performing the cycle pulse shift as described above, it is possible to prevent the occurrence of the voltage offset in the output voltage of the inverter 100. As a result, it is possible to reduce the direct-current component and the current ripple of the inverter output current generated in the near-zero cross region.

By performing the pulse edge control including the pulse shift as described above on the PWM pulse generated by the PWM control unit 220, the pulse edge control unit 250 can control the output voltage of the inverter 100 according to the timing of the zero cross point from the overmodulation region using a trapezoidal modulation wave to the one-pulse region to be the rectangular wave output in asynchronous PWM control. This can suppress the torque ripple.

By performing the cycle pulse shift as described above in the pulse edge control as necessary, the pulse edge control unit 250 can mix, within one PWM period, the PWM pulse in which the duty is switched from 0% to 100% or from 100% to 0% in one edge in accordance with the timing of the zero cross point and the PWM pulse in which the duty is switched from 0% to 100% or from 100% to 0% with two edges interposed therebetween. Due to this, the output voltage of the inverter 100 can be finely controlled from the overmodulation region to the one-pulse region.

Figure 4:
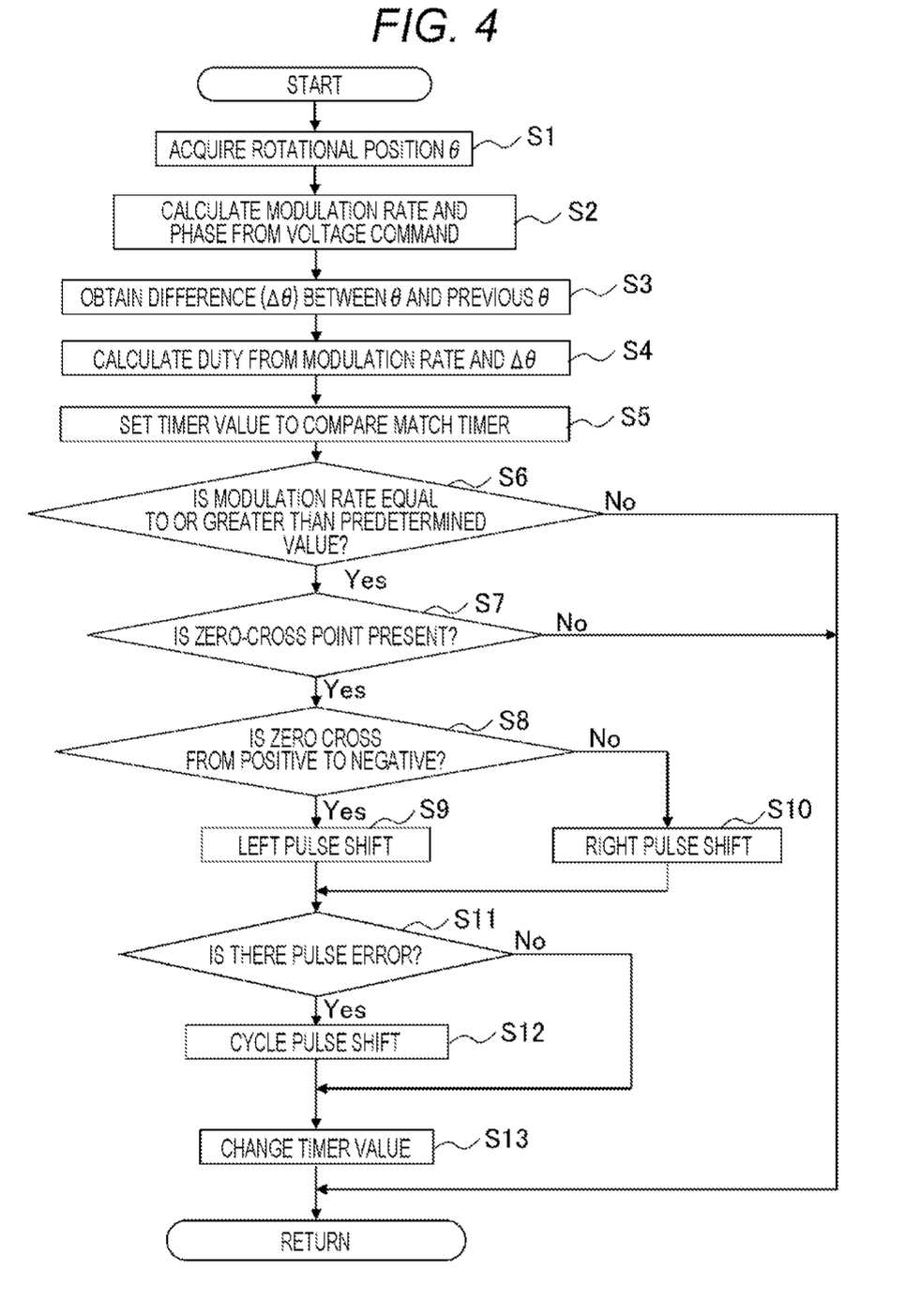
FIG. 4 is a flowchart illustrating processing of PWM pulse generation and pulse edge control in an embodiment.

Next, pulse edge control in an embodiment of the present invention will be described with reference to FIG. 4. FIG. 4 is a flowchart illustrating processing of PWM pulse generation and pulse edge control. The processing illustrated in the flowchart of FIG. 4 is implemented, for example, by a CPU executing a predetermined program in the inverter control device 200, and is performed every predetermined calculation period. Hereinafter, the flowchart of FIG. 4 will be described with the PWM control unit 220 and the pulse edge control unit 250 of FIG. 1 as processing subjects.

In step S1, the PWM control unit 220 acquires the rotational position θ of the rotor detected by the rotational position detector 270.

In step S2, the PWM control unit 220 calculates the modulation rate based on the voltage command (Vd*, Vq*) input from the current control unit 210 and the direct-current voltage DCV of the battery 2. The voltage phase angle according to the voltage command (Vd*, Vq*) is obtained using the arctangent function.

In step S3, the PWM control unit 220 obtains a rotational position change amount Δθ from a difference between the rotational position θ acquired in step S1 at the time of the previous calculation and the rotational position θ acquired in step S1 at the time of the current calculation. For example, when the rotational position θ at the time of the previous calculation is represented by θ(n−1) and the rotational position θ at the time of the current calculation is represented by θ(n), the current rotational position change amount Δθ(n) can be obtained by the following Equation (2).

$$\Delta\theta(n)=\theta(n)-\theta(n-1) \qquad (2)$$

The next rotational position change amount Δθ(n+1) can be obtained by the following Equation (3). In Equation (3), α represents the acceleration at the rotational position θ. When the motor 300 is rotating at a constant speed, α=0.

$$\Delta\theta(n+1)=\Delta\theta(n)+\alpha \qquad (3)$$

In step S4, the PWM control unit 220 calculates the duty of the PWM pulse to be output in the next PWM period based on the rotational position θ(n) acquired in step S1, the modulation rate calculated in step S2, and the next rotational position change amount Δθ(n+1) calculated in step S3. Here, for example, the rotational position @(n+1) in the next PWM period is estimated from the rotational position θ(n) and the next rotational position change amount Δθ(n−1), and the duty of the PWM pulse of each phase according to the rotational position θ(n+1) is obtained using the relationship between the modulation rate and the modulation wave described in FIG. 2.

In step S5, the PWM control unit 220 sets a timer value corresponding to the duty obtained in step S4 in each compare match timer provided corresponding to each phase. Due to this, the phases of the rising edge and the falling edge of the PWM pulse before the pulse edge control in the next PWM period are determined for each phase.

In step S6, the pulse edge control unit 250 determines whether or not the modulation rate calculated in step S2 is equal to or greater than a predetermined value. If the modulation rate is equal to or greater than the predetermined value, the process proceeds to step S7. On the other hand, if the modulation rate is less than the predetermined value, it is determined that the pulse edge control is unnecessary, and the processing illustrated in the flowchart of FIG. 4 ends. In this case, the pulse edge control unit 250 does not perform the pulse edge control, and the PWM pulse according to the timer value set in step S5 is generated by the compare match timer.

The predetermined modulation rate used as the determination condition in step S6 is, for example, a value from 1.15 in the overmodulation state to 1.25. Preferably, a value of 1.24 to 1.25, which is a modulation rate at which the modulation wave is inverted from 0% to 100% within one PWM period, is set as the determination condition of step S6.

In step S7, the pulse edge control unit 250 determines whether or not there is a zero cross point within the next PWM period. The zero cross point is a point at which the modulation wave changes across 0 as described above. When the modulation rate 1.24 to 1.25 is set as the determination condition in step S6 as described above, the modulation wave is inverted from 0% to 100% or from 100% to 0% with the zero cross point interposed therebetween. If the zero cross point is present within the next PWM period, it is determined that the pulse edge control is necessary, and the process proceeds to step S8. On the other hand, if the zero cross point is not present within the next PWM period, it is determined that the pulse edge control is unnecessary, and the processing illustrated in the flowchart of FIG. 4 ends. Also in this case, the pulse edge control unit 250 does not perform the pulse edge control, and the PWM pulse according to the timer value set in step S5 is generated by the compare match timer.

In step S8, the pulse edge control unit 250 determines whether or not the zero cross direction in the next PWM period, that is, the inversion direction of the modulation wave across the zero cross point is a direction from positive (100%) to negative (0%). In a case where the zero cross direction is the direction from positive to negative, that is, in a case where the slope of the modulation wave linearly approximated in the near-zero cross region including the zero cross point is negative and the modulation wave is inverted from positive to negative with the zero cross point interposed therebetween, it is determined that left pulse shift, which is the pulse edge control for shifting the PWM pulse to the left side, is performed, and the process proceeds to step S9. On the other hand, in a case where the zero cross direction is not the direction from positive to negative, that is, in a case where the zero cross direction is the direction from negative to positive, it is determined that right pulse shift, which is the pulse edge control for shifting the PWM pulse to the right side, is performed, and the process proceeds to step S10. The case where the zero cross direction is the direction from negative to positive is a case where the slope of the modulation wave linearly approximated in the near-zero cross region including the zero cross point is positive and the modulation wave is inverted from negative to positive with the zero cross point interposed therebetween.

In step S8, as described above, the left pulse shift and the right pulse shift are switched according to the zero cross direction. That is, the shift direction of the PWM pulse is determined based on the slope of the modulation wave linearly approximated in the near-zero cross region. Due to this, for example, even in a case where the phase of the modulation wave is inverted according to the driving state of the motor 300, such as a case where the driving state of the motor 300 is switched between power running and regeneration, and the direction of the zero cross is inverted accordingly, the pulse edge control can be performed according to the same algorithm.

In step S9, the pulse edge control unit 250 performs the left pulse shift of shifting the PWM pulse to the left direction so that the falling edge of the PWM pulse in the next PWM period matches the timing of the zero cross point of the modulation wave. Here, by changing the timer value set in the compare match timer in step S5 into the decreasing direction, the phase of the PWM pulse is shifted to the left direction so that the phase difference between the zero cross point of the modulation wave and the falling edge of the PWM pulse falls within a predetermined range.

In step S10, the pulse edge control unit 250 performs the right pulse shift of shifting the PWM pulse to the right direction so that the rising edge of the PWM pulse in the next PWM period matches the timing of the zero cross point of the modulation wave. Here, the pulse shift in the direction opposite to that in step S9 is performed. That is, by changing the timer value set in the compare match timer in step S5 in the increasing direction, the phase of the PWM pulse is shifted to the right direction so that the phase difference between the zero cross point of the modulation wave and the rising edge of the PWM pulse falls within a predetermined range.

After the processing of step S9 or S10 is executed, the process proceeds to step S11.

In step S11, the pulse edge control unit 250 determines the presence or absence of a pulse error in the PWM pulse after shift by the processing in step S9 or S10. When the timer value after change by the left pulse shift in step S9 underflows without falling within the next PWM period, or when the timer value after change by the right pulse shift in step S10 overflows without falling within the next PWM period, it is determined that there is a pulse error, and the process proceeds to step S12. On the other hand, when the timer value after change by the left pulse shift in step S9 or the timer value after change by the right pulse shift in step S10 falls within the next PWM period, it is determined that there is no pulse error, and the process proceeds to step S13. In this case, the cycle pulse shift in step S12 is not performed.

In step S12, the pulse edge control unit 250 performs the cycle pulse shift as described in FIG. 3(d) for the pulse error in the PWM pulse after the shift by the processing in step S9 or S10. Here, the pulse error is divided from the shifted PWM pulse and arranged on an end side or a start side of the next PWM period to perform the cycle pulse shift.

Specifically, when the pulse error is arranged on the end side, the timer value corresponding to the pulse error by the portion underflowed in step S9 is set on the end side of the next PWM period, similarly to the section from the time T3 to the time T4 in FIG. 3(*d*). In this case, it is preferable to switch the level of the reset signal output from the compare match timer to high (rising) so that the PWM pulse corresponding to the pulse error rises with a predetermined phase difference based on the timing of the zero cross point of the modulation wave. On the other hand, when the pulse error is arranged on the start side, the timer value corresponding to the pulse error by the portion overflowed in step S10 is set on the start side of the next PWM period, contrary to the section from the time T3 to the time T4 in FIG. 3(*d*). In this case, it is preferable to switch the level of the reset signal output from the compare match timer to low (falling) so that the PWM pulse corresponding to the pulse error falls with a predetermined phase difference based on the timing of the zero cross point of the modulation wave.

In step 313, the pulse edge control unit 250 changes the timer value set in the compare match timer in step S5 by reflecting the processing result in step S9 or S10 and the processing result in step S12. When the cycle pulse shift in step S12 is not performed, the timer value is only required to be changed by reflecting the processing result in any of step S9 or S10. Due to this, the result of the pulse edge control by the pulse edge control unit 250 can be reflected on the PWM pulse in the next PWM period obtained by the PWM control unit 220, and the PWM pulse can be corrected.

In the present embodiment, by performing the processing described above, the pulse edge control unit 250 corrects the PWM pulse so that the phase difference between the zero cross point of the modulation wave and the pulse edge of the PWM pulse falls within a predetermined range. Due to this, the inverter control device 200 of the present embodiment can output the PWM pulse in which the output voltage error of the inverter 100 is reduced in the control mode from the overmodulation region to the one-pulse region. As a result, it is possible to reduce the direct-current component and the ripple component in the output current of the inverter 100.

In step S12 of FIG. 4, the cycle pulse shift may be performed by a method different from the above method. An example of another cycle pulse shift will be described below with reference to FIG. 5.

Figure 5:
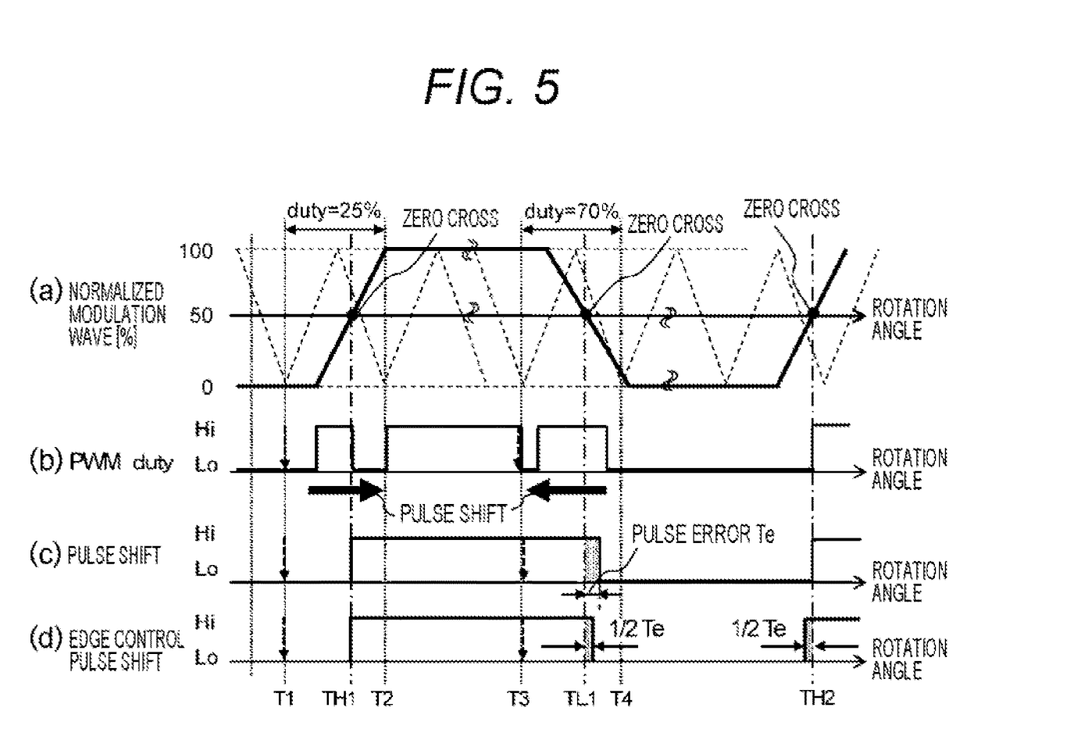
FIG. 5 is an explanatory view of another example of pulse edge control in an embodiment.

FIG. 5 is an explanatory view of another example of pulse edge control in an embodiment of the present invention. In FIG. 5, the same symbol as that in FIG. 3 indicates the same operation. In the example of FIG. 5, the operation (correction method) of the cycle pulse shift illustrated in FIG. 5(*d*) is different from that of FIG. 3(*d*).

FIG. 5(*d*) illustrates an example of a cycle pulse shift in which the portion of the pulse error Te is dispersedly arranged at a plurality of zero cross points in the pulse edge control performed by the pulse edge control unit 250 of FIG. 1. In order to compensate for the pulse error Te of FIG. 5(*c*), the pulse edge control unit 250 dispersedly arranges the pulse error Te with pulse widths of ½·Te at the timing TL1 of the zero cross point corresponding to the pulse error Te and the timing TH2 of the next zero cross point. Thus, the example of FIG. 5 is different from the example of FIG. 3 in that the error of the inverter output voltage due to the pulse error Te is compensated by dispersedly arranging the pulse error Te at a plurality of zero cross points within one period of the modulation wave.

By performing the cycle pulse shift as described above, the pulse error Te is eliminated similarly to the example of FIG. 3, so that it is possible to prevent the occurrence of the voltage offset in the output voltage of the inverter 100. As a result, it is possible to reduce the direct-current component and the current ripple of the inverter output current generated in the near-zero cross region. In the example of FIG. 3, it is necessary to switch, as described above, the level of the reset signal output from the compare match timer of the microcomputer at the timing of the zero cross point, but in the example of FIG. 5, this switching can be made unnecessary. Therefore, there is also an advantage that logic mounting of the pulse edge control unit 250 can be simplified.

In the pulse edge control unit 250 of the present embodiment, pulse edge control as illustrated in FIG. 3 or 5 is performed. Due to this, the inverter control device 200 of the present embodiment can output the PWM pulse capable of reducing the error of the output voltage of the inverter 100 while simplifying the control logic mounted on the microcomputer in the control mode from the overmodulation region to the one-pulse region. Therefore, it is possible to reduce the direct-current component and the ripple component of the inverter output current generated in the near-zero cross region.

In the above description, a case of the asynchronous PWM is taken as an example, but the PWM control using the trapezoidal modulation wave can be performed by a similar method also in the synchronous PWM. In the synchronous PWM, unlike the asynchronous PWM, the relationship between the phase of the modulation wave and the phase of the carrier signal is kept constant, and the period of the modulation wave is set to an integral multiple of the period of the carrier signal, for example. Except for this point, the same applies to both the synchronous PWM and the asynchronous PWM.

As described above, in an embodiment of the present invention, regardless of whether the PWM control method is asynchronous PWM or synchronous PWM, the pulse edge control unit 250 adjusts (corrects) the PWM pulse so that the phase difference between the zero cross point of the modulation wave and the pulse edge of the PWM pulse falls within a predetermined range in the near-zero cross region including the zero cross point of the modulation wave. As a result, it is possible to reduce the direct-current component and the ripple component of the current generated from the overmodulation region to the one-pulse region without changing the output voltage of the inverter 100.

Next, the configuration of an electric power steering device applied with the inverter control device 200 illustrated in an embodiment of the present invention will be described with reference to FIG. 6.

Figure 6:
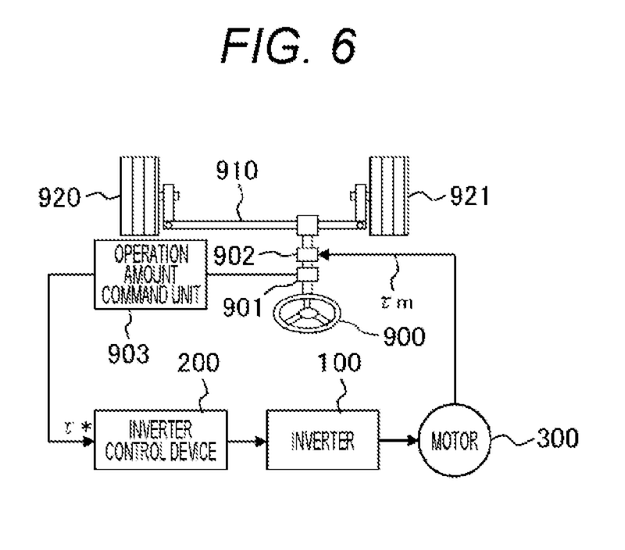
FIG. 6 is a configuration diagram of an electric power steering device applied with an inverter control device.

FIG. 6 is a configuration diagram of the electric power steering device applied with the inverter control device 200 illustrated in an embodiment of the present invention.

As illustrated in FIG. 6, an electric actuator of the electric power steering includes a torque transmission mechanism 902, the motor 300, the inverter 100, and the inverter control device 200. The electric power steering device is configured to include an electric actuator, a steering wheel (steering) 900, a steering detector 901, and an operation amount command unit 903, and the operation force of the steering wheel 900 steered by the driver performs torque assist using the electric actuator.

A torque command τ* of the electric actuator is created by the operation amount command unit 903 as a steering assist torque command of the steering wheel 900. The steering force of the driver is reduced using the output of the electric actuator driven by the torque command τ*. The inverter control device 200 receives the torque command τ* as an input command, controls the operation of the inverter 100, and controls the current flowing through the motor 300 so as to follow the torque command value from the torque constant of the motor 300 and the torque command τ*.

The motor output τm output from the output shaft directly coupled to the rotor of the motor 300 transmits torque to a rack 910 of the steering device via the torque transmission mechanism 902 using a speed reduction mechanism such as a worm, a wheel, a planetary gear, and the like, or a hydraulic mechanism. By the torque transmitted to the rack 910, the steering force (operation force) of the steering wheel 900 of the driver is reduced (assisted) by the electric force, and the steering angle of wheels 920 and 921 is operated.

This assist amount is determined as follows. That is, the steering angle and the steering torque are detected by the steering detector 901 incorporated in the steering shaft, and the torque command τ* is calculated by the operation amount command unit 903 in consideration of the state quantity such as the vehicle speed and the road surface condition.

The inverter control device 200 according to an embodiment of the present invention has an advantage that vibration and noise can be reduced by averaging the output voltage of the inverter 100 even when the motor 300 rotates at a high speed.

Figure 7:
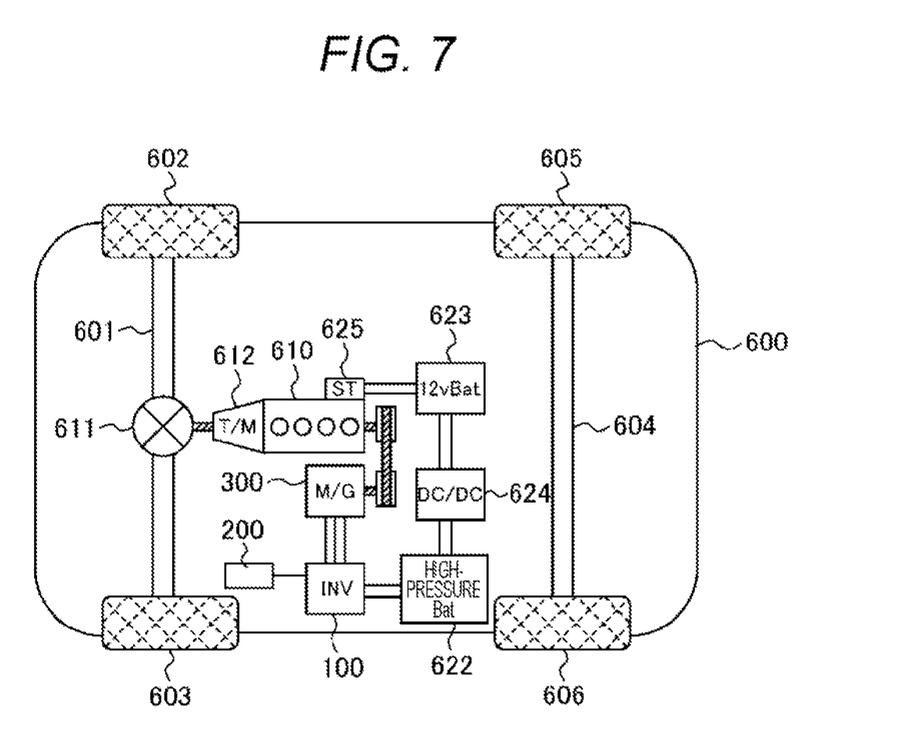
FIG. 7 is a configuration diagram of an electric vehicle applied with an inverter control device.

FIG. 7 is a view illustrating an electric vehicle 600 applied with the inverter control device 200 according to the present invention. The electric vehicle 600 has a power train in which the motor 300 is applied as a motor/generator.

A front wheel axle 601 is rotatably supported on a front portion of the electric vehicle 600, and front wheels 602 and 603 are provided at both ends of the front wheel axle 601. A rear wheel axle 604 is rotatably supported on a rear portion of the electric vehicle 600, and rear wheels 605 and 606 are provided at both ends of the rear wheel axle 604.

A central portion of the front wheel axle 601 is provided with a differential gear 611 that is a power distribution mechanism, and a rotational driving force transmitted from an engine 610 via a transmission 612 is distributed to the left-right front wheel axle 601. The engine 610 and the motor 300 are mechanically coupled via a belt stretched between a pulley provided on a crankshaft of the engine 610 and a pulley provided on a rotation shaft of the motor 300.

Due to this, the rotational driving force of the motor 300 can be transmitted to the engine 610, and the rotational driving force of the engine 610 can be transmitted to the motor 300. In the motor 300, the three-phase alternating-current power output from the inverter 100 according to the control of the inverter control device 200 is supplied to the stator coil of the stator, so that the rotor rotates and generates a rotational driving force according to the three-phase alternating-current power.

That is, while the motor 300 is controlled by the inverter control device 200 to operate as an electric motor, the motor operates as a generator that generates three-phase alternating-current power when the rotor receives the rotational driving force of the engine 610 and rotates.

The inverter 100 is a power conversion device that converts direct-current power supplied from a high-voltage battery 622, which is a high-voltage (42 V or 300 V) system power source, into three-phase alternating-current power, and controls the three-phase alternating-current current flowing through the stator coil of the motor 300 based on the operation command value and the magnetic pole position of the rotor.

The three-phase alternating-current power generated by the motor 300 is converted into direct-current power by the inverter 100 to charge the high-voltage battery 622. The high-voltage battery 622 is electrically connected to a low-voltage battery 623 via a DC-DC converter 624. The low-voltage battery 623 constitutes a low voltage (14 v) system power source of the electric vehicle 600, and is used as a power source for a starter 625 for initially starting (cold starting) the engine 610, a radio, a light, and the like.

When the electric vehicle 600 is at a stop (idle stop mode) such as waiting for a traffic light, the engine 610 is stopped, and when the engine 610 is restarted (hot start) at the time of redeparture, the motor 300 is driven by the inverter 100 to restart the engine 610.

In the idle stop mode, when the charge amount of the high-voltage battery 622 is insufficient or when the engine 610 is not sufficiently warmed, the engine 610 is not stopped and continues to be driven. During the idle stop mode, it is necessary to secure a drive source of auxiliary machines using the engine 610 as a drive source, such as a compressor of an air conditioner. In this case, the motor 300 is driven to drive the auxiliary machines.

Even at the time in the acceleration mode or the high-load operation mode, the motor 300 is driven to assist the driving of the engine 610. On the other hand, when the high-voltage battery 622 is in the charging mode requiring charging, the engine 610 causes the motor 300 to generate power to charge the high-voltage battery 622. That is, the motor 300 performs regenerative operation at the time of braking, deceleration, and the like of the electric vehicle 600.

The electric vehicle 600 includes the inverter control device 200 that generates a PWM pulse for converting a direct-current voltage into an alternating-current voltage based on a motor output request, the inverter 100 that converts the direct-current voltage into an alternating-current voltage by the generated PWM pulse and drives the motor 300, and the DC/DC converter 624 that boosts the direct-current voltage. When performing trapezoidal wave modulation using a trapezoidal wave from the overmodulation region to the one-pulse region by the processing of the pulse edge control unit 250 as described above, the inverter control device 200 adjusts the PWM pulse so as to reduce the voltage error of the inverter output voltage in the near-zero cross region including the zero cross point of the modulation wave. Due to this, it is possible to reduce the direct-current component and ripple of the current generated in the near-zero cross region and stably perform control of expanding the output range of the inverter 100 by adjusting the output voltage of the DC/DC converter 624 of the electric vehicle 600.

The inverter control device according to the present invention described above has the following effects.

(1) The inverter control device 200 of the present invention includes the PWM control unit 220 that generates a PWM pulse for controlling the inverter 100 using the modulation rate based on the voltage command, and the pulse edge control unit 250 that corrects the PWM pulse so that the phase difference between a zero cross point where a modulation wave changes across 0 and a pulse edge of the PWM pulse falls within a predetermined range. This makes it possible to reduce the direct-current component and the current ripple of the inverter output current generated in the near-zero cross region. As a result, the motor can be stably controlled up to high-speed rotation.

(2) In the inverter control device 200 of the present invention, it is preferable that the PWM control unit 220 generates a PWM pulse by linearly approximating the modulation wave in a predetermined near-zero cross region including the zero cross point, and calculating the duty of the PWM pulse based on the linearly approximated modulation wave. This makes it possible to simplify the PWM modulation processing performed using a microcomputer or the like in order to generate the PWM pulse.

(3) In the inverter control device 200 of the present invention, the pulse edge control unit 250 determines the shift direction of the PWM pulse based on the slope of the linearly approximated modulation wave (step S8), and corrects the PWM pulse by shifting the PWM pulse in the determined shift direction (steps S9 and S10). This makes it possible to correct the PWM pulse using the same algorithm even when the phase of the modulation wave is inverted according to the driving state of the motor 300 and the direction of the zero cross is inverted accordingly. As a result, the processing of the pulse edge control unit 250 can be simplified. In a case where the inverter control device 200 is mounted on the electric vehicle, the motor can be stably controlled even if the power running operation and the regenerative operation of the motor are repeatedly performed along with rapid acceleration and deceleration of the electric vehicle.

(4) In the inverter control device 200 of the present invention, if the phase difference between the zero cross point and the pulse edge of the shifted PWM pulse does not fall within the predetermined range (step S11: Yes), the pulse edge control unit 250 performs the cycle pulse shift (step S12). In this cycle pulse shift, as illustrated in FIG. 3(d), a portion of the shifted PWM pulse protruding from the predetermined range is defined as the pulse error Te, and the pulse error Te is arranged separately from the shifted PWM pulse. Alternatively, as illustrated in FIG. 5(d), a portion of the shifted PWM pulse protruding from the predetermined range is defined as the pulse error Te, and the pulse error Te is dispersedly arranged at a plurality of zero cross points. This makes it possible to smooth and suppress an error in the inverter output voltage, and stably control the motor until high-speed rotation.

(5) In the inverter control device 200 of the present invention, if the modulation rate based on the voltage command is less than the predetermined value (step S6: No), the pulse edge control unit 250 does not correct the PWM pulse. This makes it possible to efficiently suppress and reduce the error of the inverter output voltage from the overmodulation region to the one-pulse region.

(6) In the inverter control device 200 of the present invention, the pulse edge control unit 250 preferably corrects the PWM pulse so that the number of pulses of the PWM pulse included in one period of the modulation wave decreases. This makes it possible to, even in the control state in which the overmodulation region and the one-pulse region are repeatedly changed, efficiently suppress the error of the inverter output voltage, and stably control the motor until high-speed rotation. Since the number of times of switching of the inverter can be reduced, inverter control with a reduced switching loss can be achieved.

In the inverter control device 200 of the present invention described above, the PWM control unit 220 may correct the modulation rate and the phase of the modulation wave based on the voltage command such that the amount of current output from the inverter 100 to the motor 300 decreases in order to perform the weak field control on the motor 300 when performing the weak field control on the motor 300. This makes it possible to further expand the motor operation region in the overmodulation, and the one pulse region can be utilized. Therefore, it is possible to efficiently suppress an error of the inverter output voltage and to achieve inverter control in which a conduction loss and a switching loss of the inverter are reduced.

Although the case where the electric vehicle 600 of an embodiment is a hybrid car has been described, a similar effect can be obtained in the case of a plug-in hybrid vehicle, an electric vehicle, and the like.

In the above-described embodiment, the inverter control device alone has been described, but the present invention can also be applied to an inverter device in which the inverter control device and the inverter are integrated or a motor drive system in which the inverter device and the motor are integrated as long as the above-described functions are included.

The present invention is not limited to the above-described embodiment, and various modifications can be made without departing from the gist of the present invention.

REFERENCE SIGNS LIST 1 motor device
2 battery
100 inverter
200 inverter control device
210 current control unit
220 PWM control unit
250 pulse edge control unit
260 drive signal generation unit
270 rotational position detector
280 current detector
300 motor
320 rotational position sensor
600 electric vehicle

The invention claimed is:

1. An inverter control device, comprising:
a PWM control unit that generates a PWM pulse for controlling an inverter by using a modulation wave based on a voltage command, wherein the PWM control unit generates the PWM pulse by linearly approximating the modulation wave in a predetermined near-zero cross region including the zero cross point, and calculating a duty of the PWM pulse based on the modulation wave having been linearly approximated; and
a pulse edge control unit that corrects the PWM pulse such that a phase difference between a zero cross point where the modulation wave changes across 0 and a pulse edge of the PWM pulse falls within a predetermined range, wherein corrects the PWM pulse by determining a shift direction of the PWM pulse based on a slope of the modulation wave having been linearly approximated, and shifting the PWM pulse in the shift direction having been determined,
wherein when a phase difference between the zero cross point and a pulse edge of the PWM pulse after shift does not fall within the predetermined range, the pulse edge control unit sets a portion protruding from the predetermined range in the PWM pulse after shift as a pulse error, and arranges the pulse error separately from the PWM pulse after shift.

2. The inverter control device according to claim 1, wherein
the pulse edge control unit does not correct the PWM pulse when a modulation rate based on the voltage command is less than a predetermined value.

3. The inverter control device according to claim 1, wherein the pulse edge control unit corrects the PWM pulse so as to reduce a number of pulses of the PWM pulse included in one period of the modulation wave.

4. An electric vehicle system, comprising:
the inverter control device according to claim 3;
the inverter controlled by the inverter control device; and
a three-phase synchronous motor driven by the inverter, wherein
the electric vehicle system travels using a rotational driving force of the three-phase synchronous motor.

5. The inverter control device according to claim 1, wherein
the inverter is connected to a motor, and
the PWM control unit corrects a modulation rate based on the voltage command and a phase of the modulation wave such that an amount of current output by the inverter to the motor decreases in order to perform weak field control on the motor.

6. An electric vehicle system, comprising:
the inverter control device according to claim 1;
the inverter controlled by the inverter control device; and
a three-phase synchronous motor driven by the inverter, wherein
the electric vehicle system travels using a rotational driving force of the three-phase synchronous motor.

7. An inverter control device comprising:
a PWM control unit that generates a PWM pulse for controlling an inverter by using a modulation wave based on a voltage command, wherein the PWM control unit generates the PWM pulse by linearly approximating the modulation wave in a predetermined near-zero cross region including the zero cross point, and calculating a duty of the PWM pulse based on the modulation wave having been linearly approximated; and
a pulse edge control unit that corrects the PWM pulse such that a phase difference between a zero cross point where the modulation wave changes across 0 and a pulse edge of the PWM pulse falls within a predetermined range, wherein corrects the PWM pulse by determining a shift direction of the PWM pulse based on a slope of the modulation wave having been linearly approximated, and shifting the PWM pulse in the shift direction having been determined,
when a phase difference between the zero cross point and a pulse edge of the PWM pulse after shift does not fall within the predetermined range, the pulse edge control unit sets a portion protruding from the predetermined range in the PWM pulse after shift as a pulse error, and dispersedly arranges the pulse error at a plurality of zero cross points.

8. An electric vehicle system, comprising:
the inverter control device according to claim 7;
the inverter controlled by the inverter control device; and
a three-phase synchronous motor driven by the inverter, wherein
the electric vehicle system travels using a rotational driving force of the three-phase synchronous motor.

* * * * *